United States Patent [19]

Lebrun

[11] Patent Number: 5,366,272
[45] Date of Patent: Nov. 22, 1994

[54] MECHANISM SUPPORTING A THIGH-REST CUSHION

[75] Inventor: Jean Lebrun, Orne, France

[73] Assignee: Bertrand Faure Automobile "BFA", Massy, France

[21] Appl. No.: 908,343

[22] Filed: Dec. 19, 1991

[30] Foreign Application Priority Data

Dec. 19, 1990 [FR] France .................. 90 15919

[51] Int. Cl.⁵ ................................. A47C 7/50
[52] U.S. Cl. ................. 297/284.11; 297/337
[58] Field of Search ........... 297/429, 423, 284.11, 297/430, 337, 423.1, 423.19, 423.2

[56] References Cited

U.S. PATENT DOCUMENTS

| | | | |
|---|---|---|---|
| 2,078,961 | 5/1937 | Meltzer | 297/337 X |
| 2,221,268 | 11/1940 | Sears | 297/337 X |
| 4,165,126 | 8/1979 | Strien et al. | 297/284.11 |
| 4,616,877 | 10/1986 | Slaats et al. | 297/410 X |
| 4,648,654 | 3/1987 | Voss | 297/337 X |
| 4,664,444 | 5/1987 | Murphy | 297/284.11 |
| 4,753,479 | 6/1988 | Hatsutta et al. | 297/284.11 |

FOREIGN PATENT DOCUMENTS

| | | | |
|---|---|---|---|
| 114135 | 7/1984 | Japan | 297/284.11 |
| 307082 | 12/1968 | Sweden | 297/337 |
| 2165145 | 4/1986 | United Kingdom | 297/284.11 |

*Primary Examiner*—Kenneth J. Dorner
*Assistant Examiner*—David E. Allred
*Attorney, Agent, or Firm*—Robert W. Becker & Associates

[57] ABSTRACT

A lower member is connected to a sitting portion of a vehicle seat and has side portions with cutouts for guiding pins rigidly connected to a chassis. The chassis is placed above the frame member and carries a thigh-rest cushion. An adjusting element is provided for displacement of the chassis relative to the frame member.

6 Claims, 2 Drawing Sheets

MECHANISM SUPPORTING A THIGH-REST CUSHION

BACKGROUND OF THE INVENTION

The present invention relates to a mechanism supporting a thigh-rest cushion located at the front of a seat of, in particular, a land, aquatic or air-borne vehicle.

Vehicle seats are being intensively studied so as to provide maximum comfort for the user/passenger in order to prevent fatigue symptoms. Since the morphology of each passenger is different, it is necessary to provide each seat with a back and a sitting portion that comprise adjusting means which allow the positioning of the seat according to the morphology of the respective user.

Nowadays, seat backs are commonly provided with means for adjusting the inclination from front to rear and from rear to front, and they generally comprise adjustable lumbar cushions as well as adjustable headrests. However, adjusting the sitting portion is more difficult since it is provided as a single cushion.

A device which has been known for a long time allows the adjustment of the position of the sitting portion of a seat. But in order to complete the adjustment, it is desirable to have a cushion in front of the sitting portion for supporting the thighs of a passenger and thereby adjust the length of the sitting portion as a function of the length of the thighs of the passenger.

It is therefore an object of the present invention to provide a thigh-rest cushion which is adjustable with respect to its position, which is situated at the front portion of the seat, and which can be adjusted either manually or with the assistance of a motive member, for example, an electric motor.

SUMMARY OF THE INVENTION

According to the invention, the mechanism which supports a thigh-rest cushion located at the front of a seat and provides displacement of the thigh-rest cushion back and forth, comprises a lower frame member secured to a sitting portion of the seat. The frame member has side portions with cutouts for guiding pins that are rigidly connected to a chassis, this chassis being placed above the frame member and carrying the thigh-rest cushion. An adjusting means is provided for the displacement of the chassis back and forth, so as to adjust the position of the thigh-rest cushion with respect to the morphology of a passenger seated in the seat.

Various other features of the invention will become more apparent from the following detailed description.

BRIEF DESCRIPTION OF THE DRAWINGS

Embodiments of the invention are shown by way of non-limiting examples in the accompanying drawings in which.

DESCRIPTION OF PREFERRED EMBODIMENTS

Figure 1:
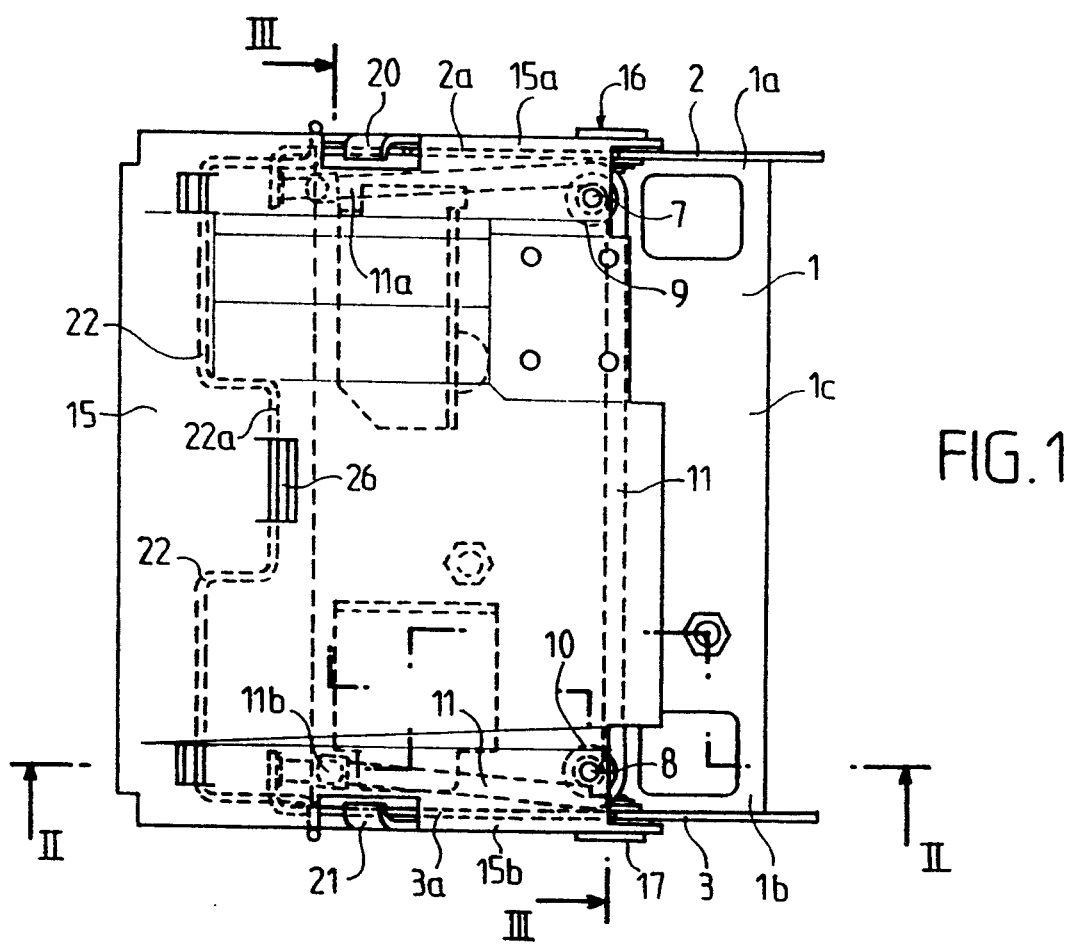
FIG. 1 is a plan view of an armature carrying the thigh-rest cushion.
Figure 2:
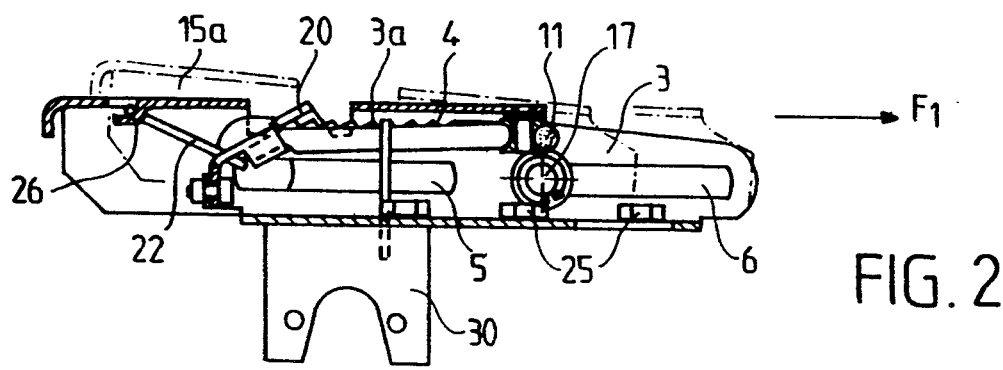
FIG. 2 is a cross-sectional view taken along the line II—II of FIG. 1.

Referring now to the drawings, FIG. 1 shows a fixed frame member 1 which is secured to an armature of the sitting portion of the seat (not shown). The frame member 1 is U-shaped, and has its two lateral sides 1a, 1b provided with two upwardly bent side portions 2, 3, the rear segments 2a, 3a of both each having the shape of a toothed rack 4 (FIG. 2). Moreover, front and rear cutouts 5, 6 are formed in the side portions 2 and 3, the cutouts 5, 6 lying in the same plane and behind one another, and having a length corresponding to the length of displacement of a thigh-rest cushion positioned at the front of the seat.

As shown in FIGS. 1 and 2, the bottom 1c of the fixed frame member 1 comprises a set of pins 7, 8 on which are mounted rollers 9, 10 for guiding a elastomeric resilient element 11 of the Sandow type. The ends 11a, 11b of the resilient element 11 are attached to a chassis 15 having downwardly bent an inverted u-shaped and side portions 15a, 15b which chassis 15 can move with respect to the fixed frame member 1 since the downwardly bent side portions 15a, 15b are guided by pins 16, 17 in the rear cutout 6 of the frame member 1. The pins 16, 17 are held by means known per se, for example, by washers at the side portions 2, 3, in order to enable an easy sliding movement of the pins 16, 17 with respect to the frame member 1. Moreover, projections 20, 21 are provided at the underside of the chassis 15, which projections 20, 21 cooperate with teeth of the racks 4 so that these projections 20, 21 will engage the teeth of the rocks 4 during the sliding movement of the chassis 15 in direction of the arrow $F_1$ (see FIG. 2). Finally, springs 22 are provided for the lowering of the chassis 15 onto the frame member 1.

Thus, in order to adjust the position of the thigh-rest cushion which is rigidly connected to an upper portion of the chassis 15, it is necessary, as shown in FIG. 2, to lift the thigh-rest cushion and the chassis 15 in order to disengage the projections 20, 21 from the teeth of the racks 4 so that the thigh-rest cushion will move, either in the direction of the arrow $F_1$ (see FIG. 2), so that the thigh-rest cushion will move towards the sitting portion of the seat, or in the opposite direction so as to slide the thigh-rest cushion forward and away from the sitting portion of the seat under the effect of the resilient element 11 which forces the thigh-rest cushion direction towards the sitting portion.

Reference numeral 25 designates members for fixation of the fixed frame member 1 on the armature of the sitting portion of the seat.

Finally, it should be noted that the spring 22 is retained at its central portion 22a by a projecting means 26 of the chassis 15.

Figure 3:
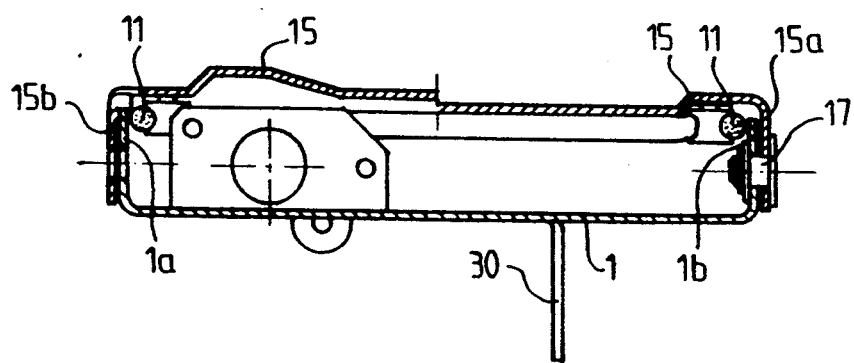
FIG. 3 is a cross-sectional view taken along the line III—III of FIG. 1.
Figure 4:
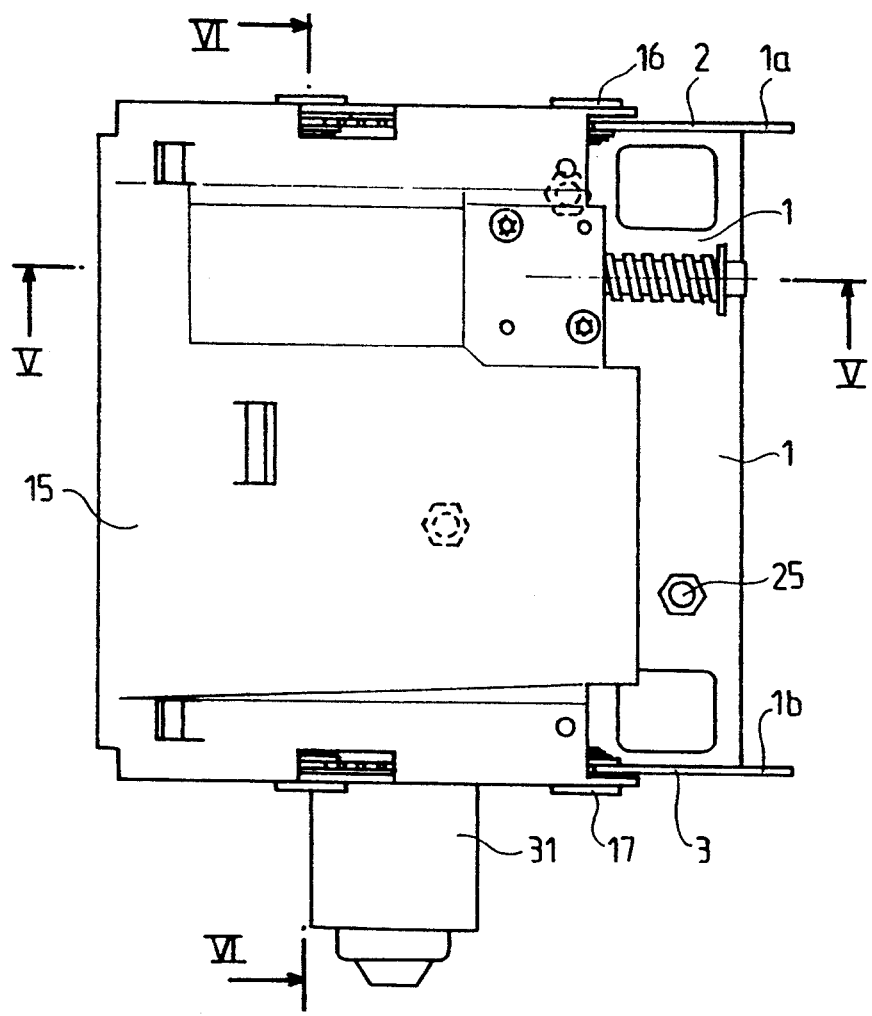
FIG. 4 is a plan view of the armature of the thigh-rest cushion with an electromechanical control.
Figure 5:
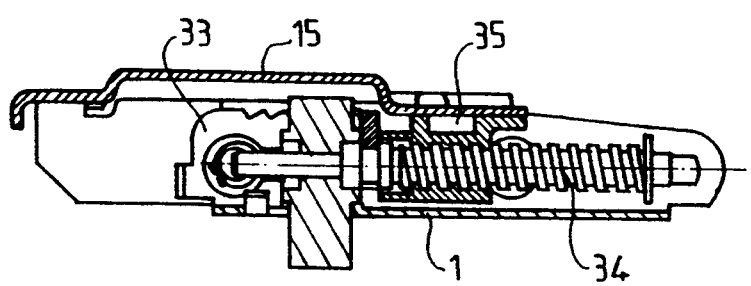
FIG. 5 is a cross-sectional view taken along the line V—V of FIG. 4.
Figure 6:
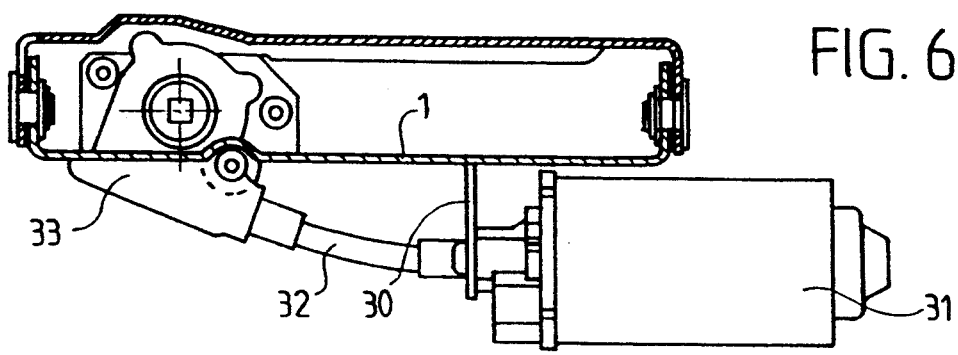
FIG. 6 is a cross-sectional view taken along the line VI—VI of FIG. 4.

In FIGS. 4 to 6, the construction of the armature of the thigh-rest cushion is identical to that described in FIGS. 1-3, and is therefore designated by same reference numerals. The lower portion of the frame member 1 comprises a lug for receiving a motor S1 which, via a flexible shaft 32, operates a gear reducing unit 33 rotatably controlling a threaded spindle 34 which, by cooperating with a guide nut 35 fixedly connected to the underside of the chassis 15, permits a back and forth movement of the chassis carrying the thigh-rest cushion.

The motor 31, which can be an electric, pneumatic or hydraulic motor, is activated via an appropriate control means. In some cases, a micro-processor will register the position previously selected by the passenger, which position may be stored in a memory with the assistance of, for example, an electronic chip or a memory card in the possession of the passenger.

The present invention is, of course, in no way restricted to the specific disclosure of the specification and drawings, but also encompasses any modifications within the scope of the appended claims.

What I claim is:

1. A mechanism, supporting a thigh-rest cushion located at a front of a vehicle seat, for displacing said thigh-rest cushion back and forth in a plane of a sitting portion of said seat; said mechanism comprising:
   a lower frame member fixedly connected to said sitting portion of said seat, said lower frame member having a U-shape with upwardly bent side portions each having a respective cutout;
   a chassis arranged above said lower frame member, said chassis having a U-shaped frame with downwardly bent side portions, wherein said downwardly bent side portions are positioned outwardly of said upwardly bent side portions and wherein said chassis has connected to a top portion thereof said thigh-rest cushion;
   guiding pins fixedly connected to said downwardly bent side portions of said chassis and engaging said cutouts of said lower frame member; and
   an adjusting means, connected to said frame member and cooperating with said chassis, for displacing said chassis relative to said frame member so as to adapt to a morphology of a passenger sitting in said seat.

2. A mechanism according to claim 1, wherein said adjustment means further comprises:
   a toothed rack connected to an upper end of each one of said upwardly bent side portions;
   projections connected to an underside of said chassis and cooperating with said toothed racks;
   a U-shaped resilient element, with free ends thereof being connected to said chassis, for assisting displacement of said chassis;
   rollers fixedly connected to said frame member, with said resilient element being guided about said rollers at an end opposite said free ends;
   a U-shaped spring, connected with a center portion thereof to said chassis, for forcing said chassis in a downward direction towards said frame member and thereby forcing said projections into engagement with said toothed racks.

3. A mechanism, supporting a thigh-rest cushion located at a front of a vehicle seat, for displacing said thigh-rest cushion back and forth in a plane of a sitting portion of said seat; said mechanism comprising:
   a lower frame member connected to said sitting portion of said seat, having upwardly bent side portions each having a respective cutout;
   a chassis arranged above said lower frame member, said chassis having connected to a top portion thereof said thigh-rest cushion;
   guiding pins fixedly connected to said chassis and engaging said cutouts of said lower frame member; and
   an adjusting means, connected to said frame member and cooperating with said chassis, for displacing said chassis relative to said frame member so as to adapt to a morphology of a passenger; and
   wherein said adjustment means further comprises:
   a) a toothed rack connected to an upper end of each one of said side portions;
   b) projections connected to an underside of said chassis and cooperating with said toothed racks;
   c) a U-shaped resilient element, with free ends thereof being connected to said frame member, for assisting displacement of said chassis;
   d) rollers fixedly connected to said underside of said chassis, with said resilient element being guided about said rollers at an end opposite said free ends; and
   e) a U-shaped spring, connected with a center portion thereof to said chassis, for forcing said chassis in a downward direction towards said frame member and thereby forcing said projections into engagement with said toothed racks.

4. A mechanism according to claim 1, wherein said adjustment means further comprises:
   a guide nut connected to the chassis;
   a threaded spindle guided in said guide nut;
   a motor connected to said frame member; and
   a gear reducing unit mounted between said motor and said threaded spindle, said motor driving said threaded spindle via said reducing unit for displacing said chassis relative to said frame member.

5. A mechanism according to claim 4, wherein said motor is selected from the group consisting of electric, pneumatic and hydraulic motors.

6. A mechanism according to claim 4, further comprising a control means for activating said motor.

* * * * *